Aug. 20, 1968    K. A. ROGERS    3,397,518
METHOD OF SEALING THE PERIPHERAL EDGE OF A FLAT PLEATED
FILTER PANEL AND THE FILTER FORMED THEREBY
Filed July 19, 1967    5 Sheets-Sheet 2

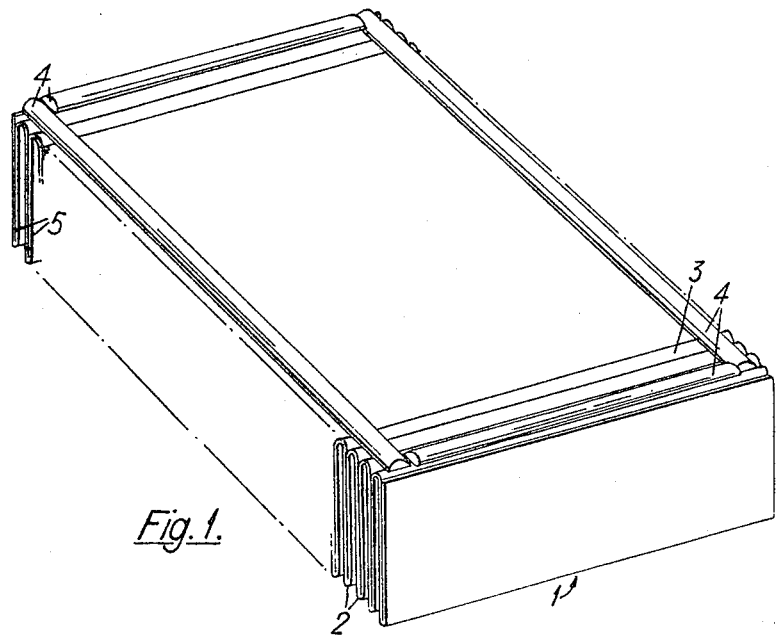
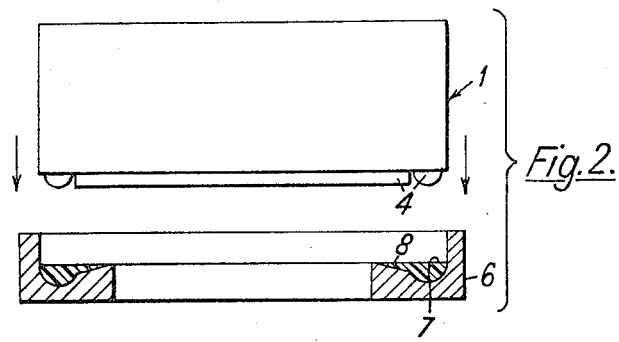
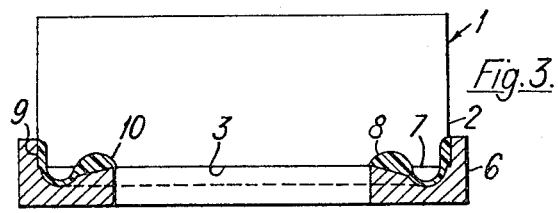

*Inventor*
Kenneth Arthur Rogers
BY C. K. Veenstra
*Attorney*

Inventor
Kenneth Arthur Rogers
BY C.K. Veenstra
Attorney

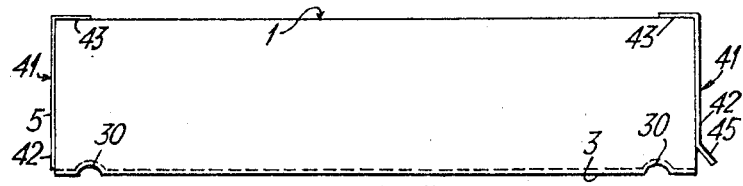
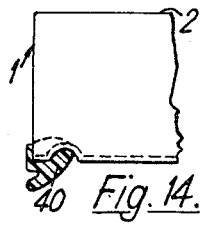
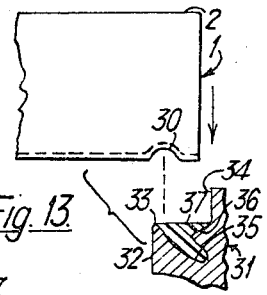
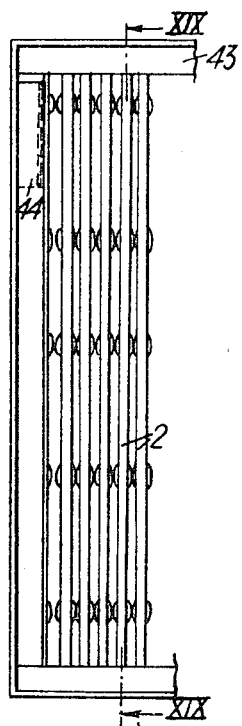
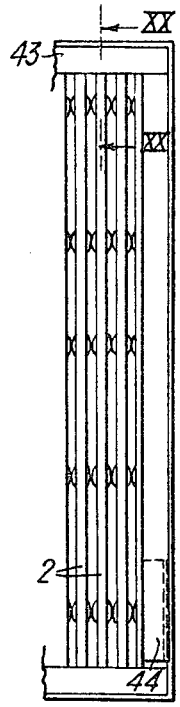
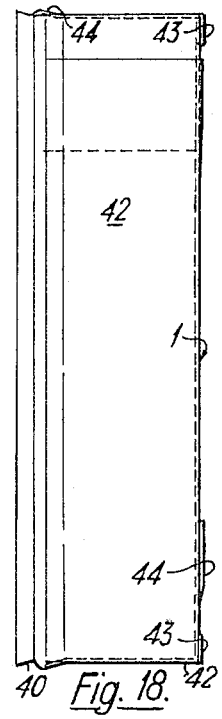

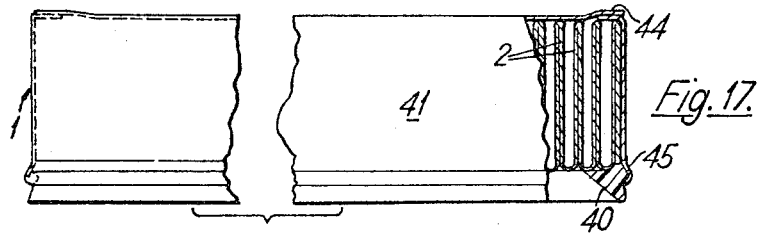
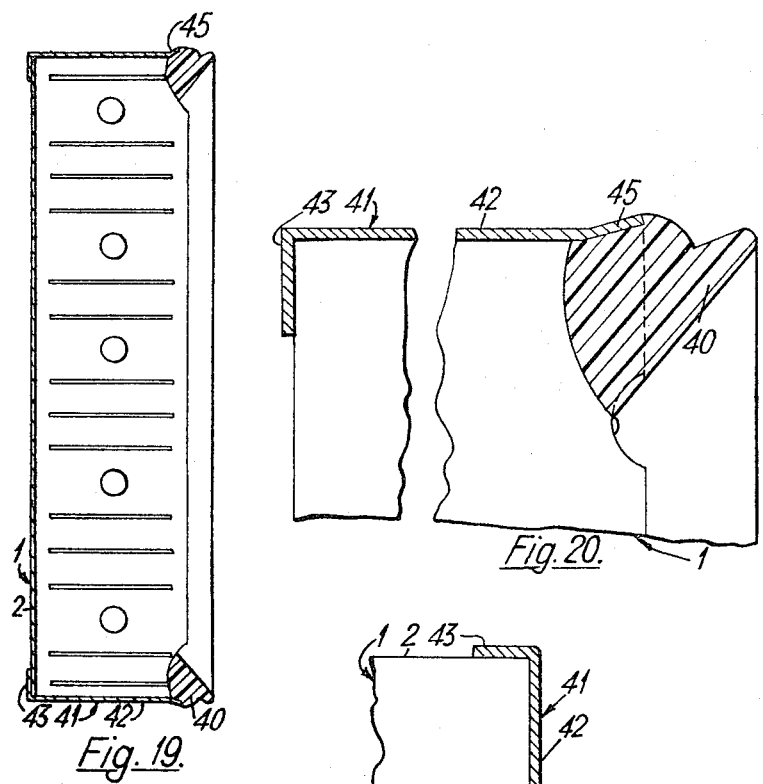

United States Patent Office 3,397,518
Patented Aug. 20, 1968

3,397,518
METHOD OF SEALING THE PERIPHERAL EDGE OF A FLAT PLEATED FILTER PANEL AND THE FILTER FORMED THEREBY
Kenneth Arthur Rogers, Chandlers Ford, England, assignor to General Motors Corporation, Detroit, Mich., a corporation of Delaware
Filed July 19, 1967, Ser. No. 654,607
Claims priority, application Great Britain, July 21, 1966, 32,844/66
10 Claims. (Cl. 55—497)

ABSTRACT OF THE DISCLOSURE

In order to form a seal about a rectangular panel-form pleated filter element it is placed in mould having a trough shape peripheral portion filled with plastisol, the peripheral portion of the panel element being formed so as partly to enter the trough and displace the plastisol upwardly so that it is forced into the spaces between the pleats at the sealed ends thereof and forms a continuous seal strip adjacent the outer edge of the panel at one face thereof.

---

This invention relates to filters for internal combustion engines, and to methods for the manufacture of such filters. The invention is suitable in particular for air filters, but could also be used for oil filters for internal combustion engines.

A filter element according to this invention comprises a strip of sheet filter material folded about a series of transverse fold lines to form a series of accordion pleats the ends of each of which are sealed separately from those of an adjacent pleat so as to form the pleats into a series of pockets, the series of pleats being arranged in the form of a flat panel at one plane face of which are the open ends of said pockets and the peripheral portion of said plane panel face having moulded and bonded thereto a continuous seal strip of elastomeric material which overlies and seals the parts of the open ends of the pockets immediately adjacent said sealed ends of the pleats and also overlies and seals the ends of the pleats and the spaces therebetween at the side faces of the panel immediately adjacent said plane panel face.

The filter element is preferably made from synthetic resin-impregnated filter paper or like sheet filter material; and the elastomeric material is preferably a thermo-setting plastisol.

An air filter element according to the invention is suitable in particular for use in a flat air filter housing having a substantially rectangular shape and having a base member with an aperture therein surrounded by a seat against which the seal strip on the air filter panel element is adapted to be pressed by a cover member which has an inlet opening therein.

The scope of the invention is defined by the appended claims; and the invention and the method by which it is to be performed are hereinafter particularly described with reference to the accompanying drawings, in which:

FIGURE 1 is a perspective view of one embodiment of a filter element according to the invention, in a first stage of manufacture thereof;

FIGURE 2 shows a vertical section of a mould and the element of FIGURE 1, in a second stage of manufacture;

FIGURE 3 shows the assembly of FIGURE 2, in a further stage of manufacture;

FIGURE 13 shows a part of the element of FIGURE 10 and a section of part of a mould used in a further stage of manufacture of the element;

FIGURE 14 shows a part of the element after removal from the mould shown in FIGURE 13;

FIGURE 15 is an end elevation of the element according to FIGURES 10 to 14, showing at the left hand and right hand portions thereof respectively two further modifications in construction;

FIGURE 16 is a plan of a panel filter element according to a further form of construction according to the invention;

FIGURE 17 is a part sectional front elevation of FIGURE 16;

FIGURE 18 is an end elevation of FIGURE 16;

FIGURES 19 and 20 are sections respectively on the lines XIX—XIX and XX—XX of FIGURE 16; FIGURE 20 being to an enlarged scale; and FIGURE 21 is a detail section of the element shown in FIGURES 16 to 20 and of a mould used in one stage of manufacture of the element.

Figure 4:
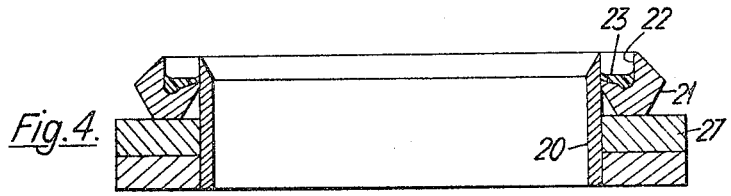
FIGURE 4 is a vertical section of a composite mould assembly used in forming a panel filter element according to another embodiment of the invention.
Figure 5:
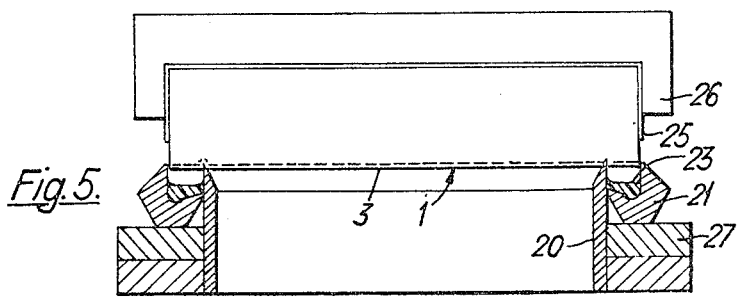
FIGURES 5 to 8 show the assembly of FIGURE 4 during further successive stages in the manufacture of the filter element.
Figure 6:
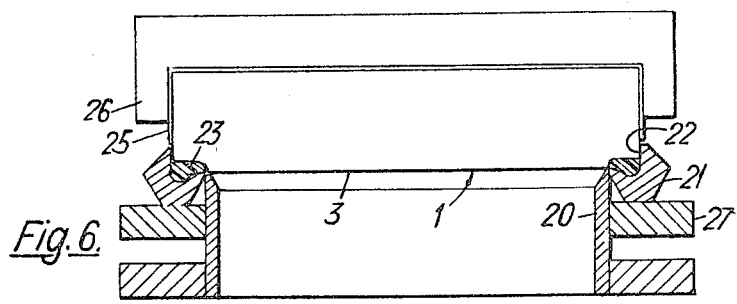

The panel form filter element 1 shown in FIGURE 1 is preferably formed, prior to the application of a sealing strip thereto, by forming in a strip of synthetic resin-impregnated filter paper a regularly spaced series of transverse fold lines, applying a strip of adhesive along each longitudinal edge portion of the strip on one side thereof and then folding the strip about the fold lines to form a plurality of accordion pleats 2, the two halves of each pleat being sealed to each other by the adhesive so that the ends 5 of each pleat 2 are sealed separately from adjacent pleats. As shown, the strip folded and pleated in this way forms a rectangular panel at one plane face of which are the open ends 3 of the pockets formed by the pleats 2 with their individually sealed ends 5. The construction of such a filter element is described in more detail in the specification of U.S. Patent 2,945,559, assigned to the assignee of the present invention, and the details of its manufacture will not therefore be further described herein.

The panel form pleated paper element 1 is placed in a jig (not shown) and a strip or bead 4 of elastomeric material, for example a thixotropic or high viscosity polyvinyl chloride plastisol paste is then applied to the aforesaid plane face of the panel 1 adjacent the sealed ends 5 of the pleats 2 along each longitudinal side of the panel 1 and in line with the end pleats at the two transverse edges of the panel.

A rectangular mould 6 (FIGURE 2) having a trough shaped moulding cavity 7 of the required section to form a bead which will protrude from the said plane face of the panel element 1 and of a shape and size to receive the panel element has the moulding cavity 7 therein filled with a plastisol 8 which is similar to that of the bead 4 but is, however, of normal viscosity. The panel element 1 with the plastisol bead 4 applied thereto is then inserted into the mould 6, the plastisol bead 4 previously applied to the plane face thereof displacing the normal viscosity plastisol 8 in the mould 6 and forcing this up into the recesses between the ends of the pleats 2 and the walls of the mould, as shown at 9 (FIGURE 3) and also into the spaces between the pleats 2 adjacent the open ends 3 of the pockets. The element 1, still in the mould 6, is then passed through an oven to cure the plastisol, the normal viscosity plastisol 8 thereby being formed into a seal strip which is bonded to and forms a seal with the ends of the pleats 2 along two opposite sides of the rectangular panel face and with the end pleats at the other two opposite sides of the face of the panel.

Thus, when the panel filter element 1 is inserted in a filter housing having one member with a rectangular recess and an inwardly extending flange which forms a seat for the element, the seal strip 8 forms a seal with the flange and can be held in such sealing engagement therewith by another member of the air filter housing secured in contact with the opposite face of the panel element, the two parts of the housing having respective air inlet and outlet openings therein in communication with the outer surfaces of the pockets and the spaces within the pockets respectively.

In an alternative method of forming the filter element with the sealing strip at the periphery of one face of the panel and the adjacent side portions of the panel, shown in FIGURES 4 to 9, a composite mould assembly is used having two slidably interfitting parts 20, 21, the inner part 20 of which forms in conjunction with the outer mould part 21, which is approximately L-shape in section, a rectangular section or trough shaped recess 22 which extends around a rectangular opening, the outer periphery of the opening being slightly larger in length and breadth than the corresponding dimensions of the panel form filter element. Into the base of the rectangular recess 22 formed by the two mould parts 20, 21 there is then placed a layer of plastisol 23, conveniently polyvinyl chloride plastisol, and a pleated paper panel form filter element constructed in the same manner as that previously described and shown in FIGURE 1, and to which similar reference numerals will therefore be applied, is then gripped in a sheet metal handling box 25 and placed on top of the mould 20, 21 with its outer periphery aligned over the rectangular recess 22.

Pressure is then applied by a press 26 (FIGURE 5) to the handling box 25 with the element 24 therein so that the element 1 is forced down onto the upper edges of the inner part 20 of the mould, the folds of the pleated element 1 adjacent the open ends of the pleat pockets 3 thereof thereby being indented to provide a restriction to spilling over of the plastisol 23 during subsequent operations.

A pressure plate 27 on which the outer member 21 of the composite mould is supported is then moved upwardly (FIGURE 6) so as to move the outer mould part 21 upwards relative to the inner mould part 20 and bring the portions of the ends of the pleats 2 of the element adjacent the open ends of the pockets 3 into a position in which they are immersed in the plastisol 23 previously placed in the rectangular recess 22 formed by the mould parts 20, 21 in their original position. With the two mould parts in their new relative positions the recess 22 is of approximate L-shape and the depression of the ends of the pleats 2 into the plastisol 23 causes the latter to be forced up into the spaces between the ends of the pleats 2 adjacent the open ends of the pockets 3 and at the side surfaces of the panel element 1, as shown. During this operation the indentations formed in the lower face of the element act as dams which prevent the plastisol from spilling over and spreading away from the wall of the mould part 21.

Figure 7:
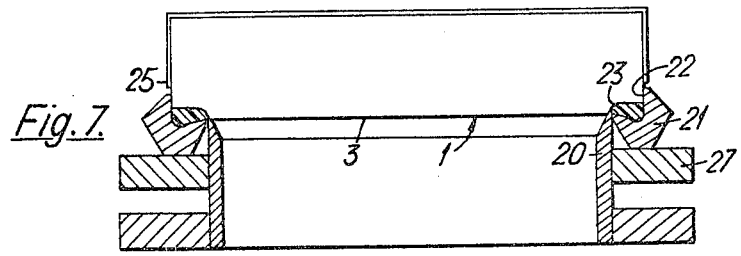
Figure 8:
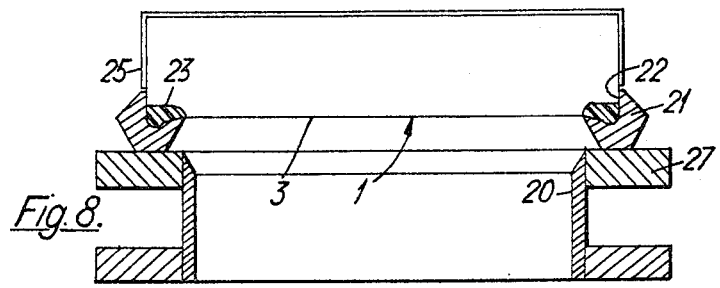
Figure 9:
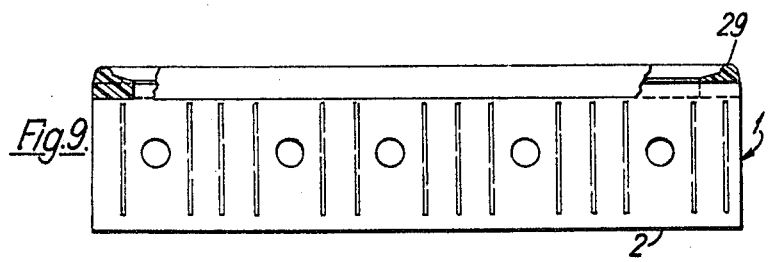
FIGURE 9 is a part sectional elevation of a panel filter element after completion of the operations shown in FIGURES 5 to 8.

The press 26 is then raised, as shown in FIGURE 7, and the pressure plate 27 is then raised to bring the element 1 and the mould part 21 clear of the inner mould part 20, as shown in FIGURE 8. The mould 20, 21 with the element 1 in the position shown in FIGURE 8, and the handling box 25 in which the element is retained, are then passed through an oven to cure the plastisol 23 and form a peripheral seal strip 29 (FIGURE 9), after which the filter element 1 with the seal strip 29 bonded to the periphery thereof is removed, the element then being as shown in FIGURE 9. The two parts 20, 21 of the mould are then restored to their previous positions and the mould is repositioned ready for use in making a further filter element.

This arrangement is suitable for use in an apparatus in which the composite mould 20, 21 is moved in shuttle fashion between one station in which the rectangular recess is filled with the plastisol 23 and another station in which the handling box 25 held in the press 26 is adapted to be brought down over the mould and the mould parts 20, 21 actuated to complete the formation of the sealing strip on the element.

Figure 10:
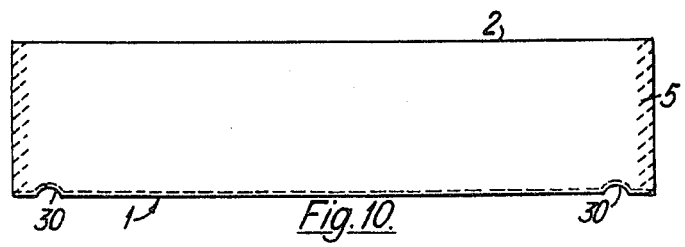
FIGURE 10 is an end elevation of another panel filter element according to the invention in a first stage of manufacture thereof.
Figures 11, 12:
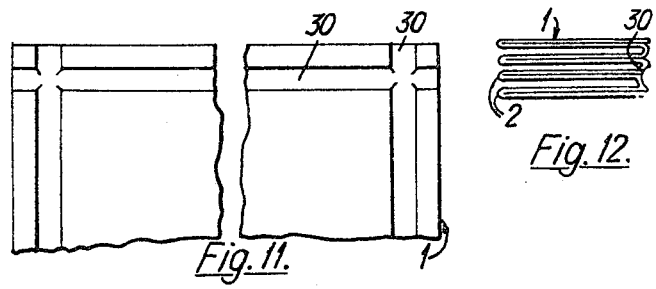
FIGURE 11 is an inverted plan of part of the element shown in FIGURE 10.
FIGURE 12 is an end view of the element, as seen from the left hand side of FIGURE 11.

In another method of forming the panel filter element with a peripheral sealing strip thereon, the panel form pleated element 1 has a peripheral recess formed therein on the face thereof at which lie the open ends of the pockets 3, the recess being spaced a short distance inwardly from the side faces of the panel. The recess may be conveniently made as two pairs of parallel rectilinear recesses 30 which intersect each other adjacent the corners of the panel, as shown in FIGURES 10 to 12, the element 1 being shown in outline only in FIGURE 11.

The recesses 30 can be made by passing the element 1, whilst the resin with which it is impregnated is still uncured, under vibratory wheels or hammer members.

The panel element 1 is then placed in a rectangular mould 31 (FIGURE 13) the base 32 of which has therein a rectangular opening, between the inner edge 33 of which and the walls 34 of the mould, the mould base 32 is formed with a continuous recess 35 which extends parallel to the mould walls. Adjacent the mould walls 34 the recess 35 is formed with a ledge portion 36 which is at a level slightly lower than the inner edge 33 of the recess 35. The arrangement is such that, when the panel element is moved downwardly into the mould 1 as indicated in FIGURE 13 the inner edge 33 of the mould recess 35 extends partly into the rectangular recess 30 formed in the element, and the outer peripheral portion of the element 1 rests on the mould ledge 36.

The mould recess 35, prior to the placing of the panel element 1 therein is filled with plastisol 37, conveniently polyvinyl chloride plastisol, and when the element 1 is pressed down on to the mould base 32 the peripheral portion of the element 1 displaces part of the plastisol 37 from the recess 35 and forces it up into the recess 30 in the face of the element, the inner edge 33 of the mould recess 35 restricting the lateral displacement of the plastisol 37 so that it is forced upwards into the spaces between the pleats 2 and between the parts of each pleat adjacent the outer periphery of the element 1 at the "open" face of the panel, that is, at the face thereof at which lie the open ends of the pockets. The mould 31 with the element therein is then passed through an oven to cure the element and plastisol. The element 1 then has a seal strip 40 (FIGURE 14) of plastisol extending around the peripheral portion of the open face thereof to enable the opposite faces of the element to be placed respectively in communication with inlet and outlet openings of a filter housing when the element is placed in the housing with the seal engaged with a seat therein.

In order to strengthen and protect the panel element 1 and maintain it at predetermined dimensions it may have side plates 41 secured thereto. The plates may be of metal but are preferably of cardboard, fibre board or like material. The plates 41 are conveniently of L-section, as shown at the left hand side of FIGURE 15, one arm 42 of the L being bonded by adhesive to a side face of the panel element 1 and the other arm 43 overlying a peripheral portion of the element face opposite that carrying the seal strip.

The side plates may extend along a pair of opposite side faces of the element or, preferably, along all four side faces, a single L-section strip being employed, with appropriate mitreing or overlapping at the corners; or a pair of strips may be joined to each other with an overlap as shown at 44 (FIGURES 16 to 18).

Preferably, the lower edge 45 of the arm 42 of the L-section side plate adjacent the recessed peripheral portion of the element is outwardly flared as shown in FIGURES 18 to 21 so that, when the element is placed in the mould 31 (FIGURE 21), the flared edge 45 scrapes the side of the mould and assists in forcing the plastisol up into the interstices between the pleats and into the recess 30 formed in the open face of the panel element 1.

I claim:

1. An air filter element, comprising a strip of sheet filter material folded about a series of transverse fold lines to form a series of accordion pleats, the ends of each pleat being sealed separately from those of adjacent pleats so as to form the pleats into a series of pockets, the series of pleats being arranged in the form of a flat panel at one plane face of which are the open ends of the pockets, and the peripheral portion of said plane panel face having moulded and bonded thereto a continuous seal strip of elastomeric material which overlies and seals the parts of the open ends of the pockets immediately adjacent said sealed ends of the pleats and also overlies and seals the ends of the pleats and the spaces therebetween at the side faces of the panel immediately adjacent said plane panel face.

2. A filter element according to claim 1, in which said sheet filter material is synthetic resin impregnated filter paper.

3. A filter element according to claim 2, in which said elastomeric material is a thermo-setting plastisol.

4. A filter element according to claim 3, in which side plates of L-section are secured thereto, one arm of the L being secured to a side face of the panel element and the other arm of the L overlying and being secured to a peripheral portion of the panel face opposite that carrying said seal strip.

5. A method of applying a seal strip to a pleated paper filter element of flat panel form, and with the ends of each of the pleats sealed separately from adjacent pleats to form pockets the open ends of which lie at one plane face of the panel, comprising indenting said one plane face of the panel to form therein a continuous peripheral groove adjacent the side faces of the panel; placing the panel element in a mould having a trough shaped moulding recess extending around a rectangular opening, said moulding recess being filled with uncured plastisol, and the inner edge of the recess being in register with said groove; pressing the element into said recess so that said inner edge of the recess enters said groove to effect displacement of the plastisol into the open ends of the pockets immediately adjacent the ends of the pleats, and into the spaces between the pleats at the side faces of the panel immediately adjacent said plane face; heating the assembled element and mould to cure the plastisol; and removing the element from the mould.

6. A method according to claim 5, said element being made of synthetic resin impregnated filter paper and said groove being formed therein prior to the curing of the resin.

7. A method according to claim 6, in which the resin and said plastisol are cured in a single heating operation.

8. A method according to claim 5, in which said element has side plates secured to the side faces thereof, the edges of said plates adjacent said one plane face of the panel being outwardly flared to engage the side wall of the mould.

9. A method according to claim 5, in which said groove is formed by pressing said panel into engagement with an inner wall portion of said mould which is movable relative to an outer wall portion of the mould, said inner mould portion thereafter being moved relative to said outer mould portion to bring the peripheral portion of said plane face and said plastisol into contact.

10. A method of applying a seal strip to a pleated paper filter element of flat panel form, and with the ends of each of the pleats sealed separately from adjacent pleats to form pockets the open ends of which lie at one plane face of the panel comprising applying a bead of high viscosity plastisol to said plane face adjacent the sealed ends of said pleats; placing the panel element in a mould having a trough shaped moulding recess extending around a rectangular opening, said recess being filled with uncured lower viscosity plastisol; pressing the element into said recess so that said bead of high viscosity plastisol enters said recess to effect displacement of lower viscosity plastisol therefrom into the open ends of the pockets immediately adjacent the ends of the pleats, and into the spaces between the pleats at the side faces of the panel immediately adjacent said plane face; heating the assembled element and mould to cure the plastisol; and removing the element from the mould.

References Cited

UNITED STATES PATENTS

| | | | |
|---|---|---|---|
| 2,945,559 | 7/1960 | Buckman | 210—493 |
| 3,013,667 | 12/1961 | Jackson et al. | 210—493 |
| 3,025,082 | 3/1962 | Toulmin | 264—263 |
| 3,042,564 | 7/1962 | Hankins | 264—257 |
| 3,133,847 | 5/1964 | Millington | 264—257 |
| 3,137,039 | 6/1964 | Von Moose St. John | 55—510 |
| 3,183,286 | 5/1965 | Harms | 55—497 |
| 3,189,179 | 6/1965 | McMichael | 210—493 |
| 3,235,633 | 2/1966 | Holloway et al. | 55—502 |
| 3,293,830 | 12/1966 | McKinlay | 55—510 |

HARRY B. THORNTON, *Primary Examiner.*

B. NOZICK, *Assistant Examiner.*